(12) United States Patent
Pang et al.

(10) Patent No.: US 8,564,896 B2
(45) Date of Patent: Oct. 22, 2013

(54) COMPACT IMAGING DEVICE

(75) Inventors: Man Yee Pang, Ma On Shan (HK); Kin Ming Fan, Kowloon (HK); Kwok Sing Cheng, Tuen Mun (HK); Sio Kuan Lam, Sheung Shui (HK)

(73) Assignee: Hong Kong Applied Science and Technology Research Institute Co., Ltd., Shatin, New Territories (HK)

( * ) Notice: Subject to any disclaimer, the term of this patent is extended or adjusted under 35 U.S.C. 154(b) by 484 days.

(21) Appl. No.: 12/860,093

(22) Filed: Aug. 20, 2010

(65) Prior Publication Data
US 2011/0299181 A1 Dec. 8, 2011

(51) Int. Cl.
*G02B 7/02* (2006.01)

(52) U.S. Cl.
USPC .......................... 359/824; 359/822; 359/823

(58) Field of Classification Search
USPC .................. 359/822–824, 694–706
See application file for complete search history.

(56) References Cited

U.S. PATENT DOCUMENTS

| | | | |
|---|---|---|---|
| 7,219,358 B2 | 5/2007 | Suzuki et al. | |
| 7,586,702 B1 | 9/2009 | Huang | |
| 7,612,957 B1 | 11/2009 | Wu et al. | |
| 7,782,559 B2 | 8/2010 | Huang | |
| 8,040,426 B2* | 10/2011 | Zhou | 348/345 |
| 2004/0017620 A1* | 1/2004 | Kaneko et al. | 359/824 |
| 2004/0169763 A1 | 9/2004 | Ikeda | |
| 2007/0047938 A1* | 3/2007 | Suzuki et al. | 396/89 |
| 2008/0037143 A1 | 2/2008 | Yoon | |
| 2009/0310959 A1 | 12/2009 | Shih | |
| 2010/0118182 A1 | 5/2010 | Fujii | |
| 2011/0304914 A1* | 12/2011 | Gutierrez et al. | 359/554 |

FOREIGN PATENT DOCUMENTS

| | | |
|---|---|---|
| CN | 101546093 | 9/2009 |
| CN | 101601274 | 9/2009 |
| CN | 101571659 | 11/2009 |
| JP | 8203104 A | 8/1996 |

OTHER PUBLICATIONS

Morio, et al., English Abstract, 1 page. JP Publication JP8203104 (A), Pub date Aug. 9, 1996, 5 pages.

* cited by examiner

*Primary Examiner* — Ricky Mack
*Assistant Examiner* — Mahidere Sahle
(74) *Attorney, Agent, or Firm* — Berkeley Law & Technology Group, LLP

(57) ABSTRACT

The subject matter disclosed herein relates to an imaging device having a small form factor.

29 Claims, 9 Drawing Sheets

COMPACT IMAGING DEVICE

FIELD

The subject matter disclosed herein relates to an imaging device having a small form factor.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can fit into limited space of the apparatuses.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

Figure 1:
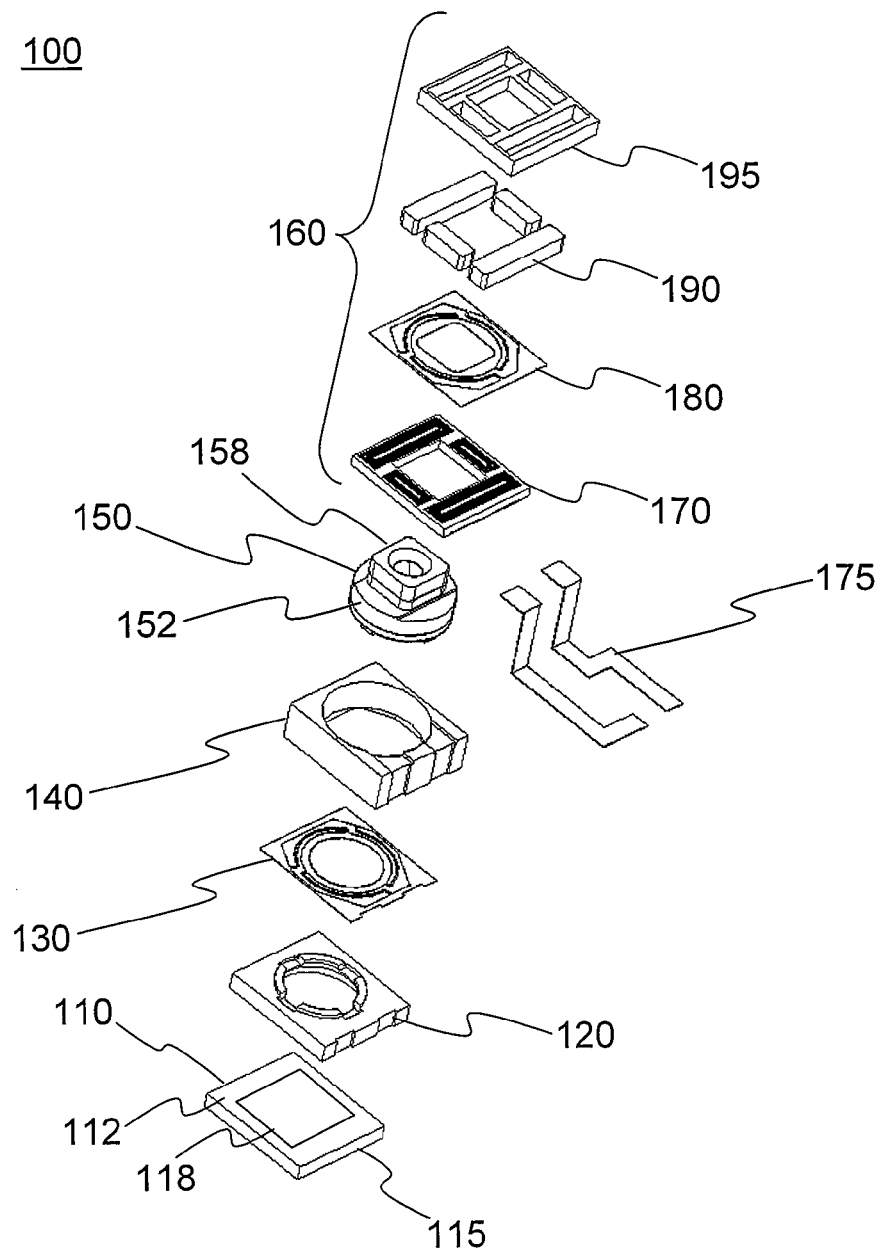
FIG. 1 is a perspective view of components that comprise a compact imaging module, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

Embodiments described herein include a compact imaging module that provides a mechanism and/or allows a process to adjust a distance between an imaging lens and an image sensor, wherein a footprint of the compact module may be substantially the same as or less than a footprint of the image sensor, for example. In other words, a surface area of a compact imaging module need not extend substantially beyond a surface area of an image sensor. Such a compact imaging module may provide an advantage to designers incorporating such a module into increasingly slimmer, smaller, and/or lighter portable electronic apparatuses, such as a compact camera, for example.

As used to describe such embodiments, terms "above", "below", "upper", "lower", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

In a particular embodiment, a relatively small footprint, such as that described above, may be achieved by, among other things, including a lens assembly having an upper portion that has a substantially smaller radial size relative to an optical axis of the lens assembly (e.g., narrower) than that of a lower portion. Accordingly, an actuator may be arranged to surround the upper portion of the lens assembly while being disposed above the lower portion of a lens assembly. In other words, an actuator may surround merely a portion of a lens assembly. In a particular embodiment, for example, an actuator incorporated in such a may be mounted on the image sensor. In comparison, for example, an actuator of a compact camera module may be mounted on a printed circuit board. In the latter case, such a compact camera module may have a relatively large size.

In a particular embodiment, for example, a structure of a compact imaging module, such as a compact camera module, may provide auto-focus and/or other imaging functions, in which an imaging lens includes a narrower upper portion compared with the lower portion. An actuator incorporated in such a configuration may comprise a surface area that does not extend substantially beyond a surface area of an image sensor of the compact camera module. In comparison, for example, an actuator of a compact camera module situated on a side of an imaging lens may result in a relatively larger imaging module profile. Such a relatively large profile may prohibit a compact camera module to have a footprint that is substantially equal to or smaller than a footprint of its image sensor. In one implementation, such an actuator may comprise a magnet and a coil to impart a magnetic force on a lens assembly. Such a magnet may have a flat or planar shape, such as the shape of a flat disk, for example. A magnet may be a permanent magnet or electromagnetic field generator, such as a coil, for example. Such a coil may be a wound coil, printed coil, and/or an electroplated coil on a substrate. A compact imaging module may comprise a spring to provide a restoring force to the lens assembly.

In other embodiments, a compact imaging module may include an actuator having a coil that moves with a lens assembly if the coil is energized, while a magnet is stationary with respect to an image sensor. In another configuration, a compact imaging module may comprise an actuator having a coil and a magnet, wherein the magnet may move with a lens assembly if the coil is energized, while the coil remains stationary.

In one particular implementation, such an actuator may comprise one or more magnets arranged in a plane. In another particular implementation, such an actuator may comprise one or more coils arranged in a plane. Such coils may be electrically connected in series and/or parallel, for example. In another particular implementation, such coils may be mounted on and/or sit on a lens assembly of a compact imaging module.

In another embodiment, a compact imaging module may include an actuator comprising at least two sets of coils to produce an electromagnetic force, wherein each set of coils is positioned in two parallel planes. In one particular implementation, such two sets of coils may be arranged substantially orthogonal to an optical axis of a lens assembly of the compact imaging module. In another particular implementation, one set of the two sets of coils may move with the lens assembly if the two sets of coils are energized, for example. Of course, such details of a compact imaging module are merely examples, and claimed subject matter is not so limited.

In an embodiment, a compact imaging module may result from mounting and/or coupling a lens assembly including one or more lenses to a portion of an actuator, and positioning an image sensor to receive light via the lens assembly. The actuator may include one or more leaf springs that are between the image sensor and the lens assembly, and one or more leaf springs that are between a coil and a magnet of the actuator. In one implementation, a lens assembly may include a first portion disposed in a central cavity of an actuator and a second portion disposed between a central cavity of the actuator and an image sensor. In one or more embodiments, the first such portion of the lens assembly may have a smaller radial size relative to an optical axis of the lens assembly than that of the second portion. In such embodiments, at least a portion of the actuator may be coupled to the image sensor. In one particular implementation, such an actuator may comprise a magnet and a printed circuit board (PCB) coil that are disposed above a lower portion of the lens assembly. As mentioned above, such a lower portion of the lens assembly may have a smaller radial size relative to an optical axis of the lens assembly than that of the upper portion of the lens assembly. For example, via a stationary support (with respect to the image sensor), a magnet of the actuator may be mounted to the image sensor while the PCB coil is rigidly attached to the lens assembly. As mentioned above, such an actuator may drive a lens assembly vertically to adjust the position of the lens assembly with respect to an image sensor. As used herein, "vertically" refers to a direction substantially parallel to an optical axis of a compact imaging module, whereas "horizontally" refers to a direction substantially in a plane which is perpendicular to an optical axis of a compact imaging module. Of course, such details of a compact imaging module are merely examples, and claimed subject matter is not so limited.

An actuator may provide a relatively precise control of motion of a lens assembly, so that various imaging functions, such as focusing for example, may lead to improved image quality. An advantage of such a compact module is that its footprint may be substantially equal to or smaller than a footprint of an image sensor, so that a surface area of the compact module does not extend substantially beyond a surface area of the image sensor. In a particular implementation, an actuator may have a footprint smaller than substantially 1.2 times the area of said image sensor. Moreover, a batch manufacturing process may be applied to fabricating such a compact module. For example, such a batch process may comprise a wafer level process to fabricate an actuator of a compact image sensor. Such a process may lead to a relatively high manufacturing efficiency, thus lowering manufacturing costs of a camera, for example, due to a focus variation function provided by the compact module.

FIG. 1 is a perspective view of components that comprise a compact imaging module 100, according to an embodiment. Such an imaging module may comprise an image sensor 110 having a ball grid array interface 115, though such an imaging module may instead include a number of different types of electrical connections. Image sensor 110 may comprise an active region 118 including an array of pixilated charge-coupled devices (CCD) and/or one or more complementary metal-oxide-semiconductor (CMOS) devices, just to name a couple of examples. Image sensor 110 may also comprise an inactive region 112 at least partially surrounding active region 118. Inactive region 112 may comprise a border or frame for active region 118, and may be used to physically support other portions of compact imaging module 100 without interfering with light impinging on active region 118. For example, a portion of actuator 160 (discussed below) may be mounted and/or coupled to inactive region 112 of image sensor 110 via a support 140, though claimed subject matter is not so limited.

In an embodiment, imaging module 100 may further comprise a lens assembly 150, which may include one or more lenses to provide an image onto active region 118 of image sensor 110. Such an image need not comprise visible wavelengths, but may also comprise infrared and/or ultraviolet wavelengths, for example. So that such an image may be focused onto active region 118, actuator 160 may adjust a position of lens assembly 150 with respect to image sensor 110. In a particular implementation, actuator 160 may adjust a vertical position of at least a portion of lens assembly 150 with respect to image sensor 110. As mentioned above, such a lens assembly may comprise one or more lenses so that the vertical position of one or more of such lenses may be adjusted as a group. In a particular implementation, actuator 160 may comprise a magnet 190, a magnet holder 195, a leaf spring 180, and/or a coil 170. Magnet holder 195 may comprise a planar holder that provides an area and/or space to accommodate one or more magnets. Electrical leads 175 may provide electrical signals to coil 170. Such leads may comprise a flexible conductor, such as a ribbon, one or more wires, and so on. Though magnet 190 is shown in FIG. 1 to include four portions, claimed subject matter is not so limited. Also, magnet holder 195 may or may not be included in an embodiment of an imaging module. Imaging module 100 may further comprise a spacer 120 disposed between a leaf spring 130 and image sensor 110, for example. Support 140 may be mounted on an outer region of leaf spring 130.

Figure 2:
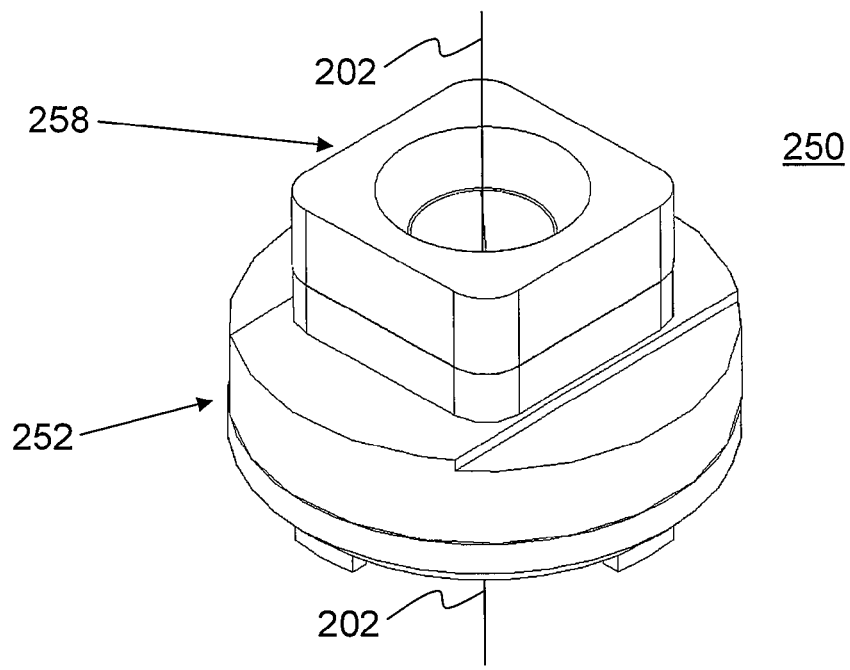
FIG. 2 is a perspective view of a lens assembly, according to an embodiment.

In one implementation, lens assembly 150 may comprise an upper portion 158 and a lower portion 152. Each such portion may include one or more lenses. Upper portion 158 may have a size that is substantially smaller than that of lower portion 152. Such a smaller size of upper portion 158 may provide space to accommodate a portion of actuator 160, as explained in further detail below, leading to a relatively compact imaging module. FIG. 2 is a perspective view of a lens assembly 250, according to an embodiment. As mentioned above, lens assembly 250 may comprise an upper portion 258 and a lower portion 252. Each such portion may include one or more lenses. In an implementation, any combination of one or more such lenses may be moveable with respect to an image sensor, such as image sensor 110 shown in FIG. 1. Upper portion 258 may have a size that is substantially smaller than that of lower portion 252. In one embodiment, such sizes of upper portion 258 and lower portion 252 may be described relative to an optical axis 202 of lens assembly 250. For example, upper portion 258 may have a smaller radial size relative to optical axis 202 of lens assembly 250 than that of lower portion 252. Of course, such details of lens assembly 250 are merely examples, and claimed subject matter is not so limited.

Figure 3:
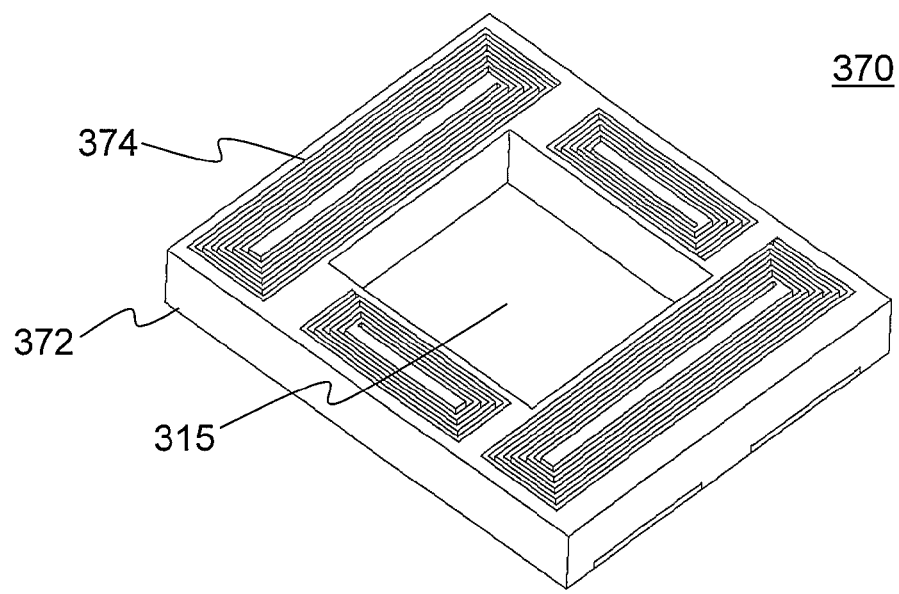
FIG. 3 is a perspective view of a coil, according to an embodiment.

FIG. 3 is a perspective view of a coil 370, according to an embodiment. Such a coil may be similar to coil 170 shown in FIG. 1, for example. In one implementation, a lens assembly, such as lens assembly 1150 shown in FIG. 11, may be mounted to coil 370, as described in detail below. Coil 370 may comprise one or more conducting coils 374 mounted on a substrate 372. For example, coil 370 may comprise multiple loops of wire in one or more layers of substrate 372. An electrical current travelling through such loops may induce a magnetic field to impart a force on a magnet, such as magnet 190 shown in FIG. 1, for example. In such a case, spring 180 may provide a restoring force to counter such a magnetic force, thereby providing a mechanism to adjust a vertical position of lens assembly 150 with respect to image sensor 110. Coil 370 may further comprise an aperture 315 to allow light along an optical axis to travel past coil 370. Though not shown, coil 370 may include electrical connection areas where electrical current may be transferred from electrical leads 175 (FIG. 1) to coil 370 or vise versa. Of course, such details of coil 370 are merely examples, and claimed subject matter is not so limited.

In one implementation, coil 370 may comprise a PCB coil, which may or may not comprise a multi-layer flexible PCB coil. Such a PCB coil may comprise a flexible PCB coil, for example. In another implementation, coil 370 may comprise a wound coil, though claimed subject matter is not so limited. A PCB coil may provide a number of benefits or advantages over a wound coil. For example, a PCB coil may be fabricated with relatively tight dimensional tolerances and may be free-standing without a need for a fixture, frame, or host. A PCB coil may be batch processed and may be relatively thin compared to a wound coil. PCB coils may be designed in a large variety of shapes and sizes. Such PCB coils may also be relatively easily designed and/or fabricated to include multiple layers to produce sufficient magnet flux.

Figure 4:
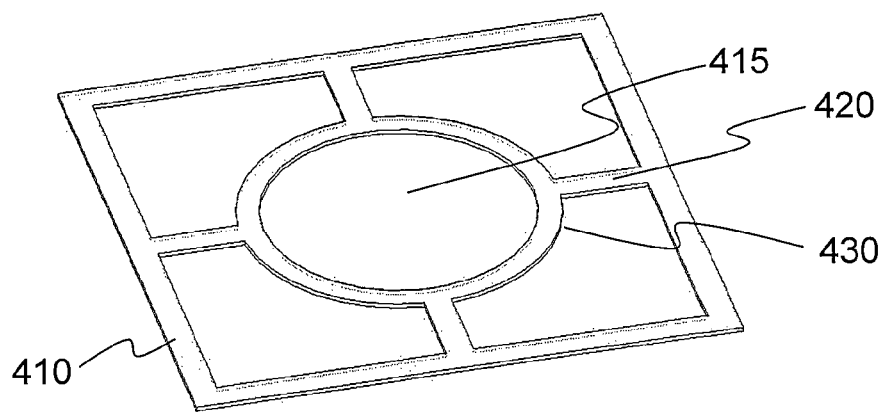
FIG. 4 is a perspective view of a spring, according to an embodiment.
Figure 5:
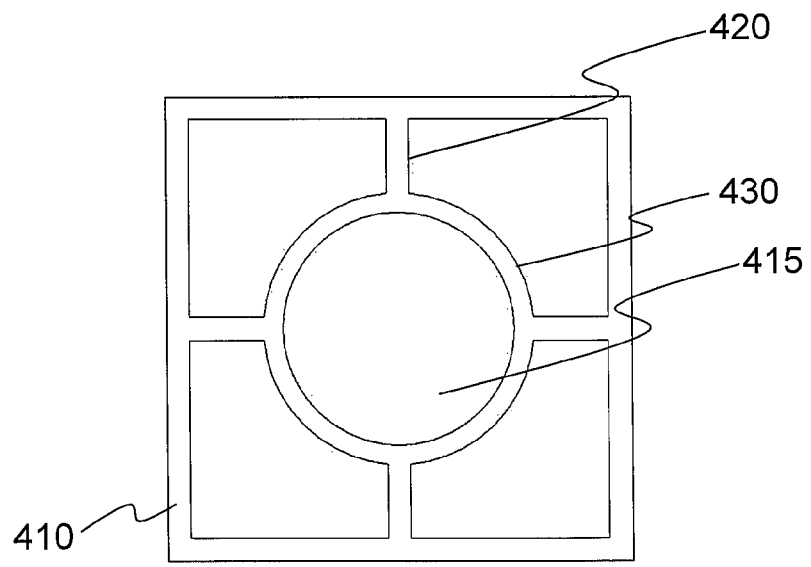
FIG. 5 is a top view of a spring, according to an embodiment.

FIG. 4 is a perspective view of a spring 480 and FIG. 5 is a top view of spring 480, according to an embodiment. Such a spring may comprise a leaf spring such as leaf spring 180 shown in FIG. 1, for example. In one implementation, spring 480 may comprise a central portion 430 and an arm portion 420 adapted to move or flex as a spring. For example, central portion 430 and an arm portion 420 may provide a restoring force if central portion 430 and an arm portion 420 are displaced from a neutral configuration. A fixed portion 410 may comprise an outer portion of spring 480 which may be fixedly mounted to one or more components of a compact imaging module. For example, central portion 430 and arm portion 420 may flex in a spring-like manner while fixed portion 410 is held in a relatively fixed position. Spring 480 may further comprise an aperture 415 to allow light along an optical axis to travel past spring 480. Of course, such details of spring 480 are merely examples, and claimed subject matter is not so limited.

Figure 6:
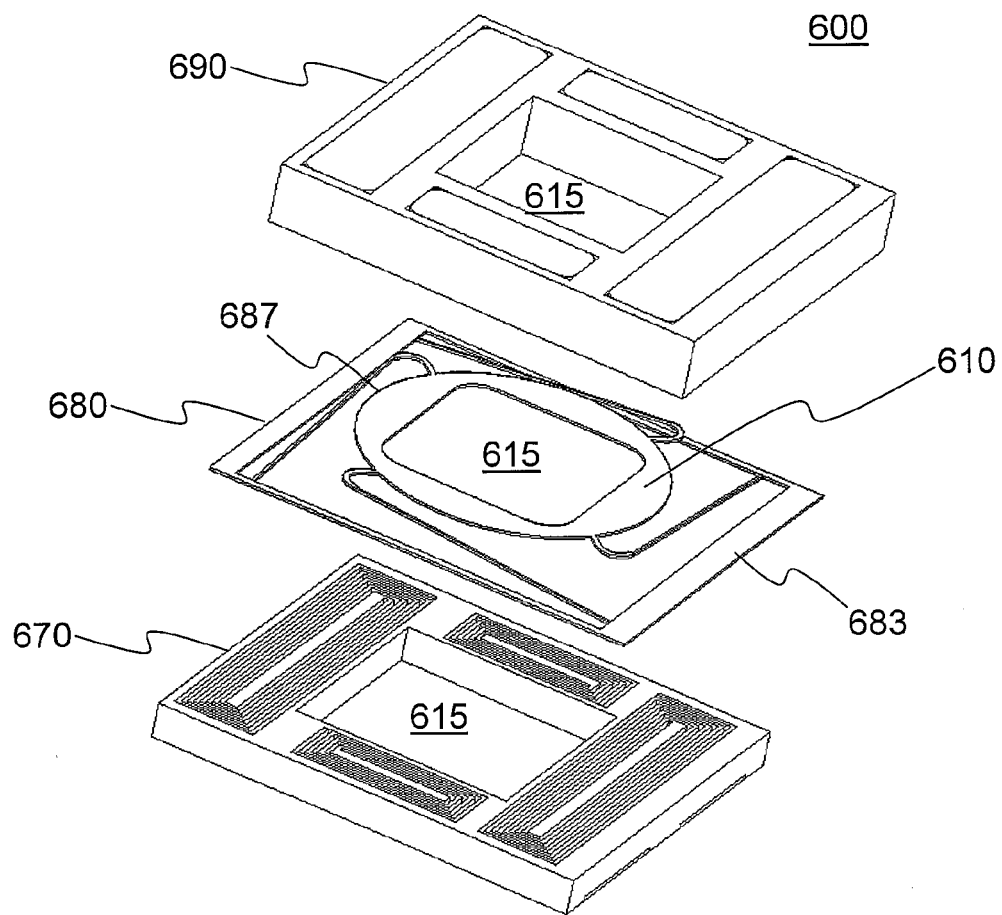
FIG. 6 is a perspective view of a portion of an actuator, according to an embodiment.

FIG. 6 is a perspective view of a portion of an actuator 600, according to an embodiment. Such a portion may comprise a coil 670, a leaf spring 680, and a magnet 690. As mentioned above, magnet 690 may comprise one or more permanent magnets in a variety of configurations. Accordingly, details of magnet 690, as well as details of leaf spring 680 and coil 670, shown in FIG. 6 are merely examples, and claimed subject matter is not so limited. In one implementation, leaf spring 680 may include an outer region 683 that may be physically attached to portions of coil 670. For example, edges of outer region 683 may be attached to corresponding edges of coil 670, which may be stationary with respect to image sensor 110 shown in FIG. 1. Also, a central region 687 of leaf spring 680 may be physically attached to portions of magnet 690. For example, portions of central region 687 may be attached to corresponding portions of magnet 690, which may be fixed to move with lens assembly 150 shown in FIG. 1. Coil 670, leaf spring 680, and magnet 690 include an aperture 615 to accommodate at least a portion of lens assembly 150. Of course, such details of a portion of an actuator are merely examples, and claimed subject matter is not so limited.

Figure 7:
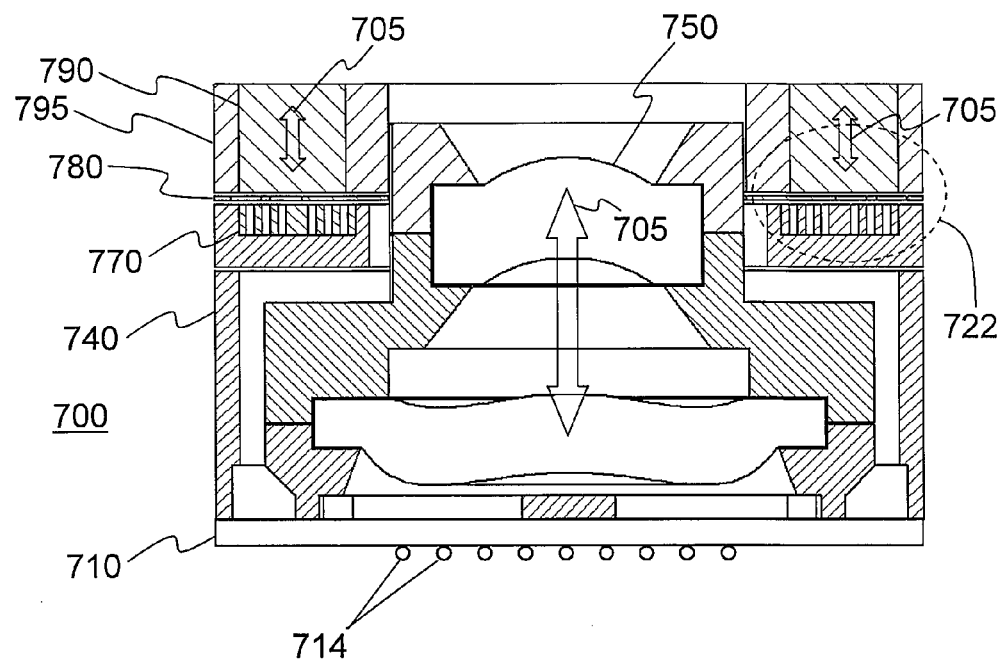
FIG. 7 is a cross-section view of components that comprise a compact imaging module, according to an embodiment.

FIG. 7 is a side view of components that comprise a compact imaging module 700, according to an embodiment. Such an imaging module may comprise an image sensor 710, which may be similar to image sensor 110 shown in FIG. 1, for example. Imaging module 700 may further comprise a lens assembly 750 to provide an image onto an active region, such as active region 118 shown in FIG. 1 for example, of image sensor 710. In one particular implementation, lens assembly 750 may comprise an upper portion that extends into central apertures of one or more actuator elements such as magnet 790 and coil 770. Coil 770 may be mechanically mounted and/or coupled to image sensor 710 via support 740, for example. Magnet 790 may be supported by a magnet supporting unit 795, though claimed subject matter is not so limited. So that such an image is focused onto image sensor 710, an actuator may adjust a position of lens assembly 750 with respect to image sensor 710. A direction of such positioning is depicted by arrow 705, for example. Additional arrows 705 shown on magnets 790 indicate that magnets 790 may be rigidly tied to lens assembly 750, and thus may move with lens assembly 750. Such a lens assembly may comprise one or more lenses, and the vertical position of one or more such lenses may be adjusted as a group by an actuator. In a particular implementation, compact imaging module 700 may further comprise leaf spring 780. Image sensor 710 may comprise ball grid array 714 for electrical connections to one or more external components (not shown). An embodiment of a portion 722 of an actuator comprising coil 770, spring 780, and magnet 790 is shown in detail in FIG. 8.

Figure 8:
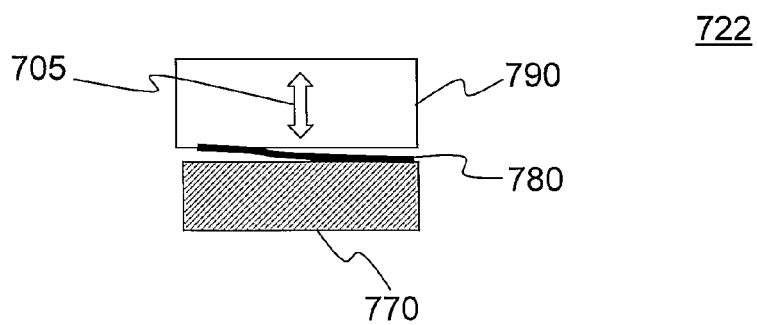
FIG. 8 is a close-up view of a non-activated actuator, according to an embodiment.

FIG. 8 is a close-up view of a portion 722 of a non-activated actuator, according to an embodiment. For example, such an actuator may include a coil 770, a leaf spring 780, and a magnet 790. Arrow 705 indicates that magnet 790 may change position relative to image sensor 710, whereas coil 770 may be stationary with respect to image sensor 710 and rigidly attached to image sensor 710. Such an actuator may be non-activated if, for example, there is no electrical current travelling through coil 770. Lacking such a current, there may be no magnetic field to produce a repulsive force with respect to magnet 790. Accordingly, lens assembly 750 rigidly attached to magnet 790 may remain relatively near image sensor 710. Such examples are limited to an actuator that is activated or not activated. Alternatively, an actuator may involve varying degrees of activation based, at least in part, on a varying magnitude of electrical current travelling in coil 770. Such varying degrees of activation may provide varying distances between lens assembly 750 and image sensor 710 to precisely control a focus of light onto image sensor 710. For example, a distance between lens assembly 750 and image sensor 710 may be based, at least in part, on a magnetic field, wherein such a distance is measured along an optical axis of a lens assembly. Of course, such details of a compact imaging module are merely examples, and claimed subject matter is not so limited.

Figure 9:
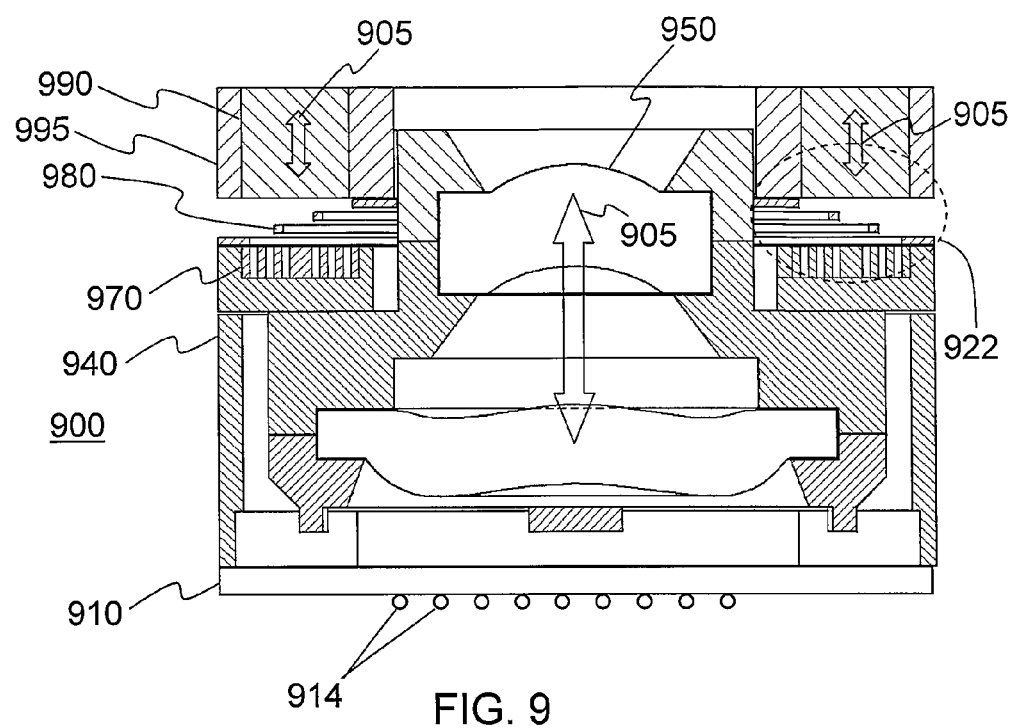
FIG. 9 is a cross-section view of components that comprise a compact imaging module, according to an embodiment.

FIG. 9 is a side view of components that comprise a compact imaging module 900, according to an embodiment. Such an imaging module may comprise an image sensor 910, which may be similar to image sensor 110 shown in FIG. 1, for example. Imaging module 900 may be similar to imaging module 700 shown in FIG. 7, with one difference being that an actuator of imaging module 900 may be activated whereas imaging module 700 may not be activated. In the particular embodiment shown, an activated actuator may increase a distance between image sensor 910 and a lens assembly 950. Imaging module 900 may comprise lens assembly 950 to provide an image onto an active region, such as active region 118 shown in FIG. 1 for example, of image sensor 910. In one particular implementation, lens assembly 950 may comprise an upper portion that extends into central apertures of one or more actuator elements such as magnet 990 and coil 970. Magnet 990 may be supported by a magnet supporting unit 995, though claimed subject matter is not so limited. So that such an image is focused onto image sensor 910, an actuator may adjust a position of lens assembly 950 with respect to image sensor 910. A direction of such positioning is depicted by arrow 905, for example. Additional arrows 905 shown on magnets 990 indicate that magnets 990 may be rigidly tied to lens assembly 950, and thus may move with lens assembly 950. Such a lens assembly may comprise one or more lenses, and the vertical position of one or more such lenses may be adjusted as a group by an actuator. In a particular implementation, compact imaging module 900 may further comprise leaf spring 980 and coil 970, which may be mechanically mounted and/or coupled to image sensor 910 via support 940, for example. Image sensor 910 may comprise ball grid array 914 for electrical connections to one or more external components (not shown). An embodiment of a portion 922 of an actuator comprising coil 990, spring 980, and magnet 990 is shown in detail in FIG. 10.

Figure 10:
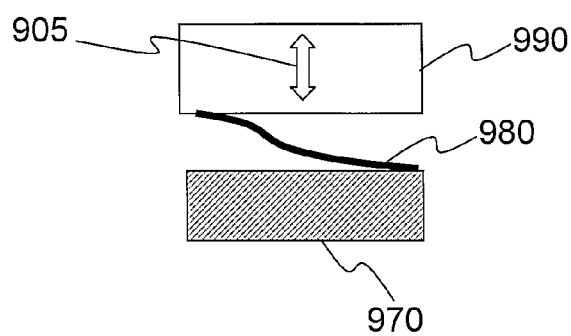
FIG. 10 is a close-up view of an activated actuator, according to an embodiment.

FIG. 10 is a close-up view of a portion 922 of an activated actuator, according to an embodiment. For example, such an actuator may include a coil 970, a leaf spring 980, and a magnet 990. Arrow 905 indicates that magnet 990 may change position relative to image sensor 910, whereas coil 970 may be stationary with respect to image sensor 910 and rigidly attached to image sensor 910. Such an actuator may be activated if, for example, there is an electrical current travelling through coil 970. In the presence of such a current, there may be a magnetic field to produce a repulsive force with respect to magnet 990. Accordingly, lens assembly 950 rigidly attached to magnet 990 may move away from image sensor 910, thus increasing a distance between lens assembly 950 and image sensor 910. As explained above, such examples are limited to an actuator that is activated or not activated. Alternatively, an actuator may involve varying degrees of activation based, at least in part, on a varying magnitude of electrical current travelling in coil 970. Such varying degrees of activation may provide varying distances between lens assembly 950 and image sensor 910 to precisely control a focus of light onto image sensor 910. For example, a distance between lens assembly 950 and image sensor 910 may be based, at least in part, on a magnetic field, wherein such a distance is measured along an optical axis of a lens assembly. Of course, such details of a compact imaging module are merely examples, and claimed subject matter is not so limited.

Figure 11:
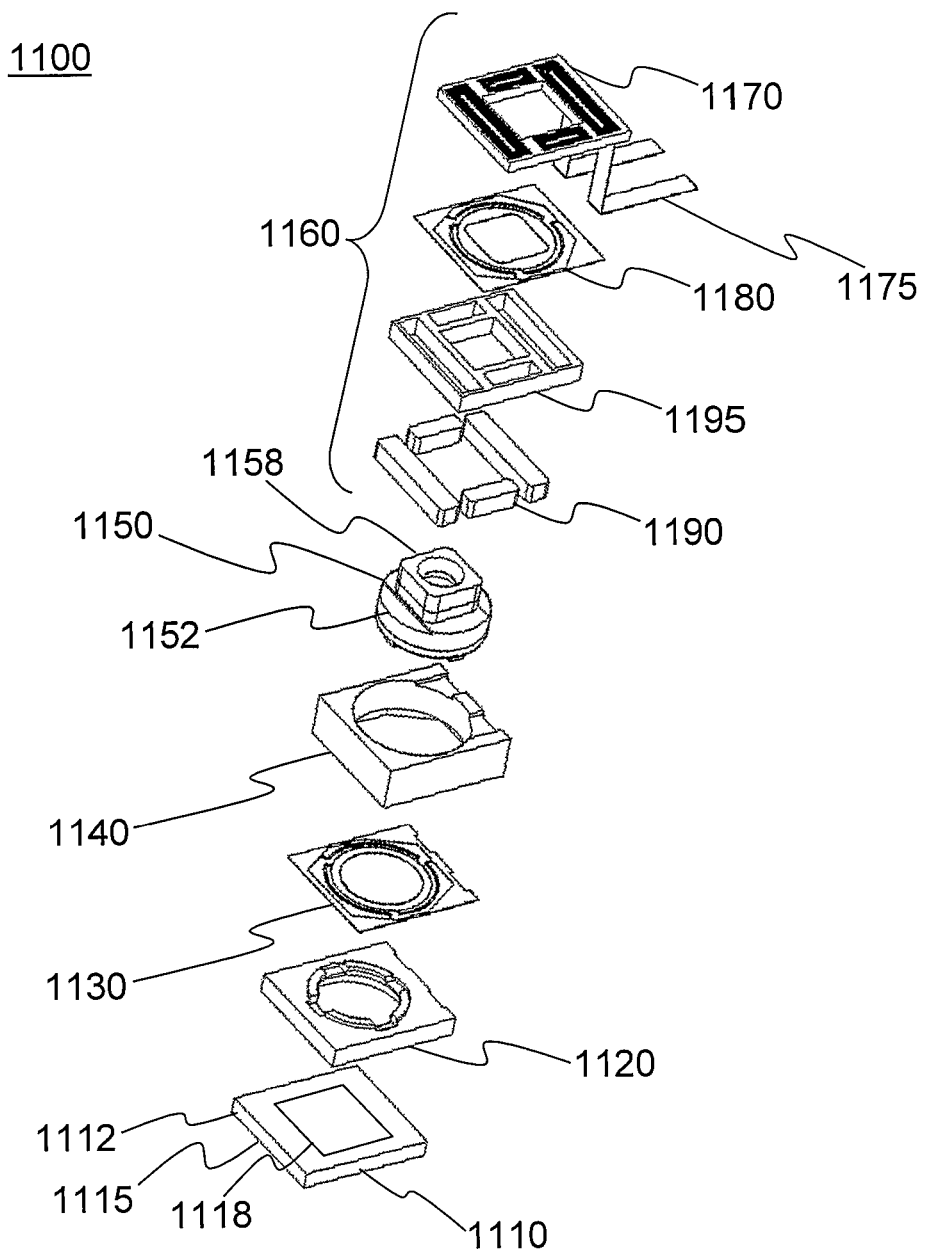
FIG. 11 is a perspective view of components that comprise a compact imaging module, according to another embodiment.

FIG. 11 is a perspective view of components that comprise a compact imaging module 1100, according to an embodiment. Such an imaging module may be similar to imaging module 100 shown in FIG. 1 except that relative positions of coil 170 and magnet 190 of actuator 160 may be interchanged in actuator 1160, for example. Similar to imaging module 100, imaging module 1100 may comprise an image sensor 1110 having a ball grid array interface 1115, though such an imaging module may instead include a number of different types of electrical connections. Image sensor 1110 may comprise an active region 1118 and an inactive region 1112 at least partially surrounding active region 1118. Inactive region 1112 may comprise a border or frame of active region 1118, and may be used to physically support other portions of compact imaging module 1100. For example, a portion of actuator 1160 may be mounted and/or coupled to inactive region 1112 of image sensor 1110 via a support 1140, though claimed subject matter is not so limited.

In an embodiment, imaging module 1100 may further comprise a lens assembly 1150, which may include one or more lenses to provide an image onto active region 1118 of image sensor 1110. As explained above, so that such an image is focused onto active region 1118, actuator 1160 may adjust a position of lens assembly 1150 with respect to image sensor 1110. In a particular implementation, actuator 1160 may adjust a vertical position of at least a portion of lens assembly 1150 with respect to image sensor 1110. As mentioned above, such a lens assembly may comprise one or more lenses so that the vertical position of one or more of such lenses may be adjusted as a group. In a particular implementation, actuator 1160 may comprise a magnet 1190, a magnet holder 1195, a leaf spring 1180, and/or a coil 1170. Electrical leads 1175 may provide electrical signals to coil 1170. Such leads may comprise a flexible conductor, such as a ribbon, one or more wires, and so on. Imaging module 1100 may further comprise a spacer 1120 disposed between a leaf spring 1130 and image sensor 1110, for example. Support 1140 may be mounted on an outer region of leaf spring 1130.

Similar to lens assembly 150 shown in FIG. 1, lens assembly 1150 may comprise an upper portion 1158 and a lower portion 1152. Each such portion may include one or more lenses. Upper portion 1158 may have a diameter that is substantially smaller than that of lower portion 1152. Such a smaller diameter of upper portion 1158 may provide space to accommodate a portion of actuator 1160, as explained in further detail below, leading to a relatively compact imaging module.

Figure 12:
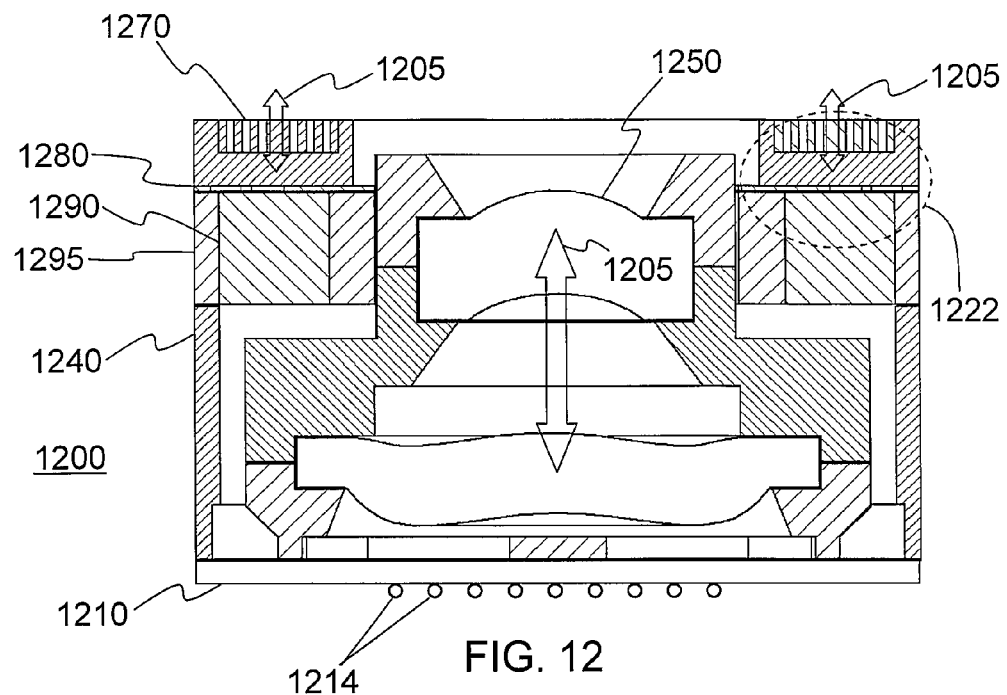
FIG. 12 is a cross-section view of components that comprise a compact imaging module, according to another embodiment.

FIG. 12 is a side view of components that comprise a compact imaging module 1200, according to an embodiment. Such an imaging module may be similar to imaging module 700 shown in FIG. 7 except that relative positions of coil 1270 and magnet 1290 of an actuator may be interchanged, for example. Similar to imaging module 700, imaging module 1200 may comprise an image sensor 1210, which may be similar to image sensor 110 shown in FIG. 1, for example. Imaging module 1200 may further comprise a lens assembly 1250 to provide an image onto an active region, such as active region 118 shown in FIG. 1 for example, of image sensor 1210. In one particular implementation, lens assembly 1250 may comprise an upper portion that extends into central apertures of one or more actuator elements such as magnet 1290 and coil 1270. Magnet 1290 may be mechanically mounted and/or coupled to image sensor 1210 via support 1240, for example. In a particular implementation, magnet 1290 may be supported by a magnet supporting unit 1295, though claimed subject matter is not so limited. So that such an image is focused onto image sensor 1210, an actuator may adjust a position of lens assembly 1250 with respect to image sensor 1210. A direction of such positioning is depicted by arrow 1205, for example. Additional arrows 1205 shown on coils 1270 indicate that coils 1270 may be rigidly tied to lens assembly 1250, and thus may move with lens assembly 1250. This is in contrast to a configuration of imaging module 700, for example. Such a lens assembly may comprise one or more lenses, and the vertical position of one or more such lenses may be adjusted as a group by an actuator. In a particular implementation, compact imaging module 1200 may further comprise leaf spring 1280. Image sensor 1210 may comprise ball grid array 1214 for electrical connections to one or more external components (not shown). An embodiment of a portion 1222 of an actuator comprising coil 1270, spring 1280, and magnet 1290 is shown in detail in FIG. 13.

Figure 13:
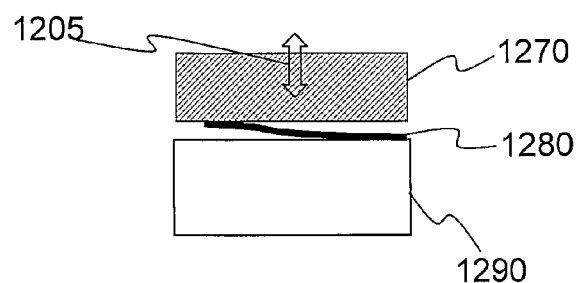
FIG. 13 is a close-up view of a non-activated actuator, according to an embodiment.

FIG. 13 is a close-up view of a portion 1222 of a non-activated actuator, according to an embodiment. For example, such an actuator may include a coil 1270, a leaf spring 1280, and a magnet 1290. Arrow 1205 indicates that coil 1270 may change position relative to image sensor 1210, whereas magnet 1290 may be stationary with respect to image sensor 1210 and rigidly attached to image sensor 1210 via support 1240. Such an actuator may be non-activated if, for example, there is no electrical current travelling through coil 1270. Lacking such a current, there may be no magnetic field to produce a repulsive force with respect to magnet 1290. Accordingly, lens assembly 1250 rigidly attached to magnet 1290 may remain relatively near image sensor 1210. Such examples are limited to an actuator that is activated or not activated. Alternatively, an actuator may involve varying degrees of activation based, at least in part, on a varying magnitude of electrical current travelling in coil 1270. Such varying degrees of activation may provide varying distances between lens assembly 1250 and image sensor 1210 to precisely control a focus of light onto image sensor 1210. For example, a distance between lens assembly 1250 and image sensor 1210 may be based, at least in part, on a magnetic field, wherein such a distance is measured along an optical axis of a lens assembly. Of course, such details of a compact imaging module are merely examples, and claimed subject matter is not so limited.

Figure 14:
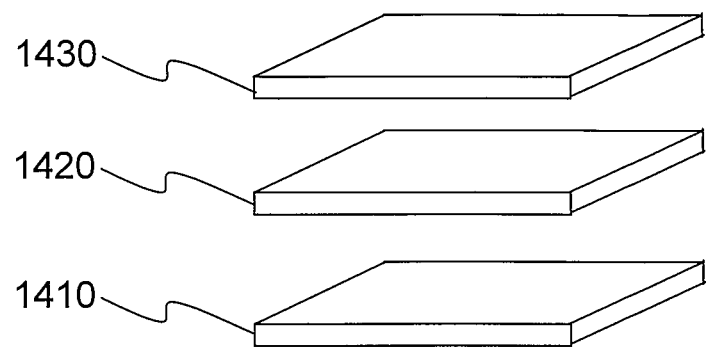
FIG. 14 is a perspective view of components of an actuator, according to an embodiment.
Figure 15:
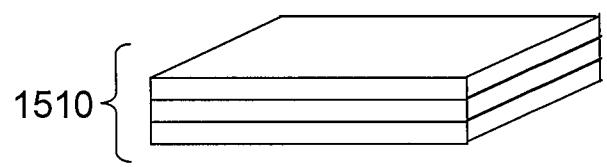
FIG. 15 is a perspective view of components of an actuator, according to another embodiment.
Figure 16:
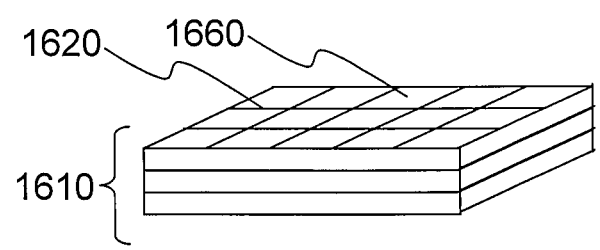
FIG. 16 is a perspective view of components of an actuator, according to yet another embodiment.

FIGS. 14-16 show various stages of a batch process to fabricate multiple actuators, such as actuators 160 and/or 1160 shown in FIGS. 1 and 11, respectively. In particular, FIG. 14 is a perspective view of components to fabricate an actuator, according to an embodiment. Such components may comprise a PCB coil sheet 1430, a planar spring (e.g., a leaf spring) sheet 1420, and/or a magnet sheet 1410. Here, "sheet" refers to a relatively thin layer that may comprise multiple components. For example, magnet sheet 1410 may comprise multiple individual magnets arranged substantially in an array, planar spring sheet 1420 may comprise multiple individual planar springs arranged substantially in an array, and PCB coil sheet 1430 may comprise multiple individual PCB coils arranged substantially in an array. In a relatively early stage of fabrication, such sheets may be lined up relative to one another and laminated together to form an array 1510 of individual actuator, as shown in FIG. 15. Subsequently, such individual actuators may be separated from one another by cutting actuator array 1510 substantially along edges of the individual actuators. For example, FIG. 16 shows an array 1610 of individual actuators 1660 having edges 1620, where such cutting may be performed to separate actuators 1660. Subsequently, though not shown, separated actuators 1660 may be mounted and/or coupled to image sensors during a process of assembling a compact imaging module. Lens assemblies may then be mounted to actuators 1660 so that a first portion of the lens assemblies is disposed in a central cavity of the actuators and a second portion of the lens assemblies is disposed between the central cavity of the actuators and the image sensors, wherein the first portion has a smaller diameter than that of the second portion, as described above. Of course, such details of a fabricating process of a compact imaging module are merely examples, and claimed subject matter is not so limited.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An optical apparatus comprising:
   a lens assembly including one or more lenses, wherein said lens assembly comprises a narrow portion and a wide portion, and wherein said narrow portion has a smaller radial size relative to an optical axis of said lens assembly than that of said wide portion;
   an image sensor below said lens assembly to receive light from said lens assembly; and
   an actuator including at least one magnet, at least one coil, and a leaf spring disposed between said magnet and said coil to produce an electromagnetic force, wherein said actuator comprises a central cavity to receive said narrow portion of said lens assembly, wherein said narrow portion of said lens assembly is disposed in said central cavity of said actuator and said wide portion of said lens assembly is disposed below said coil, wherein said magnet comprises a first layer and said coils comprise a second layer, wherein said magnet is attached to an outer surface of said narrow portion of said lens assembly, wherein said magnet and said lens assembly move vertically relative to said coil, wherein said second layer is placed between said first layer and said wide portion of said lens assembly, and wherein at least a portion of said actuator is coupled to said image sensor.

2. The optical apparatus of claim 1, wherein, in a top-view, said actuator does not extend substantially beyond said image sensor.

3. The optical apparatus of claim 1, wherein said actuator has a footprint smaller than 1.2 times the area of said image sensor.

4. The optical apparatus of claim 1, wherein said at least one coil is located between said wide portion of said lens assembly and said at least one magnet.

5. The optical apparatus of claim 1, wherein said at least one coil comprises a printed circuit board (PCB) coil.

6. The optical apparatus of claim 1, wherein said at least one coil comprises a multi-layer PCB coil.

7. The optical apparatus of claim 1, wherein said at least one coil comprises a wound coil.

8. The optical apparatus of claim 1, wherein said actuator is mounted on said image sensor.

9. The optical apparatus of claim 1, wherein said spring comprises a first portion that is movable with respect to said image sensor, and a second portion that is fixed with respect to said image sensor.

10. The optical apparatus of claim 9, wherein said first portion of said leaf spring is attached to said at least one magnet.

11. The optical apparatus of claim 9, wherein said second portion of said leaf spring is attached to said at least one coil.

12. A method comprising:
positioning a central cavity of an actuator sheet to receive a portion of a lens assembly including one or more lenses, wherein said actuator sheet includes at least one sheet magnet and at least one sheet coil to produce an electromagnetic force;
positioning an image sensor to receive light from said lens assembly; and
mounting said at least one sheet magnet of said actuator sheet to said portion of said lens assembly and mounting another portion of said actuator sheet to said image sensor to adjust a position of said lens assembly in response to said electromagnetic force,
wherein said portion of said lens assembly has a smaller radial size relative to an optical axis of said lens assembly than that of a remaining portion of said lens assembly.

13. The method of claim 12, wherein said actuator sheet further comprises at least one leaf spring.

14. The method of claim 13, wherein said at least one leaf spring comprises a first portion that is movable with respect to said image sensor, and a second portion that is fixed with respect to said image sensor.

15. The method of claim 14, further comprising attaching said first portion of said at least one leaf spring to said at least one sheet magnet.

16. The method of claim 14, further comprising attaching said second portion of said at least one leaf spring to said at least one sheet coil.

17. The method of claim 12, wherein said at least one sheet coil comprises a printed circuit board (PCB) coil.

18. A method comprising:
forming an actuator wafer comprising multiple actuators by a batch process laminating together:
a sheet-like array of printed circuit board (PCB) coils;
a sheet-like array of leaf springs; and
a sheet-like array of magnets;
cutting said actuator wafer to separate said actuators comprising one of said PCB coils, one of said leaf springs, and one of said magnets;
coupling said actuators to image sensors; and
mounting lens assemblies to said actuators so that a first portion of said lens assemblies is disposed in a central cavity of said actuators and a second portion of said lens assemblies is disposed between said central cavity of said actuators and said image sensors, wherein said first portion has a smaller radial size relative to an optical axis of said lens assembly than that of said second portion.

19. The method of claim 18, wherein said actuator has a footprint smaller than substantially 1.2 times the area of said image sensor.

20. The method of claim 18, wherein said sheet-like array of leaf springs is laminated between said sheet-like array of PCB coils and said sheet-like array of magnets.

21. The method of claim 20, wherein said mounting said lens assemblies to said actuators is performed so that said leaf springs comprise a first portion that is movable with respect to said image sensor, and a second portion that is fixed with respect to said image sensor.

22. The method of claim 21, further comprising attaching said first portion of said leaf springs to said magnets.

23. The method of claim 21, further comprising attaching said second portion of said leaf springs to said coils.

24. The method of claim 18, further comprising at least partially attaching said magnets to said first portion of said lens assemblies.

25. The method of claim 19, wherein said footprint of said actuator is substantially equal to a footprint of said image sensor.

26. An optical apparatus comprising:
a lens assembly including one or more lenses;
an image sensor to receive light from said lens assembly;
an actuator sheet to adjust a position of said lens assembly, said actuator sheet including a central cavity to receive a first portion of said lens assembly, at least one sheet magnet, and at least one sheet coil to produce an electromagnetic force; and
a spring disposed between said at least one sheet magnet and said at least one sheet coil,
wherein said at least one sheet coil is disposed on top of said at least one sheet magnet along said optical axis,
wherein said first portion of said lens assembly is disposed in said central cavity of said actuator sheet and a second portion of said lens assembly is disposed between said central cavity of said actuator sheet and said image sensor,
wherein said first portion has a smaller radial size relative to an optical axis of said lens assembly than that of said second portion,
wherein at least a portion of said actuator sheet is coupled to said image sensor,
wherein said at least one sheet coil is attached to said first portion of said lens assembly, wherein said spring comprises a first portion that is movable with respect to said image sensor, and a second portion that is fixed with respect to said image sensor, wherein said first portion of said spring is attached to said at least one sheet coil, and wherein said second portion of said spring is attached to said at least one sheet magnet.

27. An optical apparatus comprising:

a lens assembly including one or more lenses, wherein said lens assembly comprises a narrow portion and a wide portion, and wherein said narrow portion has a smaller radial size relative to an optical axis of said lens assembly than that of said wide portion;

an image sensor below said lens assembly to receive light from said lens assembly; and an actuator including at least one magnet, at least one coil, and a leaf spring disposed between said magnet and said coil to produce an electromagnetic force, wherein said actuator comprises a central cavity to receive said narrow portion of said lens assembly, wherein said narrow portion of said lens assembly is disposed in said central cavity of said actuator and said wide portion of said lens assembly is disposed below said magnet, wherein said magnet comprises a first layer and said coils comprise a second layer, wherein said coil is attached to an outer surface of said narrow portion, wherein said coil and said lens assembly move vertically relative to said magnet, wherein said first layer is placed between said second layer and said wide portion, and wherein at least a portion of said actuator is coupled to said image sensor.

28. An optical apparatus comprising:

a lens assembly including one or more lenses, wherein said lens assembly comprises a narrow portion and a wide portion, and wherein said narrow portion has a smaller radial size relative to an optical axis of said lens assembly than that of said wide portion;

an image sensor below said lens assembly to receive light from said lens assembly; and an actuator sheet including at least one magnet, at least one sheet coil, and a leaf spring disposed between said magnet and said sheet coil to produce an electromagnetic force, wherein said actuator sheet comprises a central cavity to receive said narrow portion of said lens assembly, wherein said narrow portion of said lens assembly is disposed in said central cavity of said actuator sheet and said wide portion of said lens assembly is disposed below said actuator sheet, wherein said at least one magnet is attached to said narrow portion, and wherein at least a portion of said actuator sheet is coupled to said image sensor.

29. An optical apparatus comprising:

a lens assembly including one or more lenses, wherein said lens assembly comprises a narrow portion and a wide portion, and wherein said narrow portion has a smaller radial size relative to an optical axis of said lens assembly than that of said wide portion;

an image sensor below said lens assembly to receive light from said lens assembly; and an actuator sheet including at least one magnet, at least one sheet coil, and a leaf spring disposed between said magnet and said sheet coil to produce an electromagnetic force, wherein said actuator sheet comprises a central cavity to receive said narrow portion of said lens assembly, wherein said narrow portion of said lens assembly is disposed in said central cavity of said actuator sheet and said wide portion of said lens assembly is disposed below said actuator sheet, wherein said at least one sheet coil is attached to said narrow portion, and wherein at least a portion of said actuator sheet is coupled to said image sensor.

* * * * *